(12) United States Patent  
Riewerts et al.

(10) Patent No.: US 7,478,603 B2
(45) Date of Patent: Jan. 20, 2009

(54) SEED METER MONITORING SYSTEM (75) Inventors: Paul Reed Riewerts, Port Byron, IL (US); Duane Allen Coordes, Rock Island, IL (US)

(73) Assignee: Deere & Company, Moline, IL (US)

( * ) Notice: Subject to any disclaimer, the term of this patent is extended or adjusted under 35 U.S.C. 154(b) by 301 days.

(21) Appl. No.: 11/436,500

(22) Filed: May 18, 2006

(65) Prior Publication Data

US 2007/0266917 A1 Nov. 22, 2007

(51) Int. Cl.
*A01C 15/00* (2006.01)
(52) U.S. Cl. .................. 111/200; 111/900; 111/903; 111/904
(58) Field of Classification Search .......... 111/200, 111/900, 903, 904
See application file for complete search history.

(56) References Cited

U.S. PATENT DOCUMENTS

| | | | |
|---|---|---|---|
| 4,018,358 A | 4/1977 | Johnson et al. | 221/7 |
| 4,225,930 A | 9/1980 | Steffen | 364/555 |
| 4,519,525 A | 5/1985 | Wunschl et al. | 221/211 |
| 4,555,624 A | 11/1985 | Steffen | 250/223 |
| 6,758,153 B1 | 7/2004 | Hagen et al. | 111/185 |
| 2005/0224510 A1 | 10/2005 | Remis et al. | 221/69 |

*Primary Examiner*—Christopher J. Novosad (57) ABSTRACT

A detector is supported adjacent the seed cells within a seed meter housing and provides an indication of the presence or absence of seeds in the cells. A processor receives the seed presence indications and provides an operator readout to facilitate adjustments to the seed meter system to maintain a single seed per seed cell at the given seed population. In one embodiment, the detector is a video camera and the readout includes a slow motion rendering of the seed cells downstream of a seed singulator. In another embodiment, a light source is located on one side of the seed cells, and a light detector is located on the opposite side of the seed cell to determine presence or absence of material in the cell.

27 Claims, 6 Drawing Sheets

|  |  | Seed Population | | |
|---|---|---|---|---|
|  |  | Low | Okay | High |
| Empty Cells? | Yes | Vacuum Level / Seed Disk Problems / Singulator Too Aggressive | Multiple Seeds in Cells (adjust pressure and/or singulator) | Multiple Seeds in Cells (adjust pressure and/or singulator) |
|  | No | Plugged Cells | Okay | Multiple Seeds in Cells (adjust pressure and/or singulator) |

Fig. 6

SEED METER MONITORING SYSTEM

FIELD OF THE INVENTION

The present invention relates generally to seed meters for agricultural seeding implements and, more specifically, to a method and apparatus for analyzing and adjusting seed meter operation.

BACKGROUND OF THE INVENTION

Getting the right seeding rate/population has always been a problem for growers. Many crops are sensitive to proper spacing in order to produce the highest yield per unit of area, and growers want to know if they are seeding at the proper rate for a given hybrid while they are planting. Currently available seed monitors generally provide a good indication of population or seeds per unit area. However, many missing seeds and many multiple seeds in the same field can result in a correct overall field seed population, but with undetected skips and doubles that cause yield reductions.

The grower wants to know if there is one seed in every metering cell or if there is seed missing or multiple seeds in the cell. If each cell is not populated with a single seed, it is necessary to know how to adjust the meter to correct the problem. Recommended adjustments can be made with available technology, but often there is no easy way for the grower to determine if the changes made are the correct ones. On John Deere planters, for example, the operator can increase or decrease vacuum level, increase or decrease the transmission setting, adjust the double eliminator, change seed disks or provide various combinations of adjustments and changes.

SUMMARY OF THE INVENTION

It is therefore an object of the present invention to provide an improved arrangement for monitoring seed in an agricultural seed meter. It is another object to provide such an arrangement which overcomes most or all of the aforementioned problems.

It is a further object of the present invention to provide an improved seed meter monitor for facilitating the elimination of multiple seeds or missing seeds in the seed cell of a seed meter for a more uniform crop stand. It is yet another object to provide such a monitor which permits an operator to view seeds in the meter while the meter is in operation and to make adjustments necessary to assure there is a single seed in each of the cells of a seed disk.

In one embodiment of the invention, a light source with a fiber optic cable is routed into the seed metering chamber and positioned such that light shines through an empty seed cell as it passes the cable. A light sensor or receiver is positioned on the opposite side of the seed metering disk. If there are seeds in the cells the light is blocked. However, light passing through the cell and detected by the receiver is an indication that the cell is empty and that there will be a skip in the field. By monitoring the population and presence or absence of empty seed cells, a matrix can be provided to determine what types of adjustments should be made to the metering system. For example, if during a monitoring period no skips are detected and the population is within the desired range, then no adjustments are necessary. However, if there are no skips but a high seed population, the operator knows that either the doubles eliminator or vacuum level needs adjustment to reduce the number of multiple seeds or the planter transmission setting is too high. If no skips are indicated with a low population, the transmission setting is too low. If the detector indicates skips and yet the population is okay or high, the doubles eliminator and/or the transmission or vacuum level is too high. Advantageously, the system can also diagnose a situation wherein the overall seed population is within the prescribed range but there are problems of multiple seeds in some seed cell areas in combination with empty seed cells.

In another embodiment, a light source is provided at the seed metering chamber to illuminate the seeding disk cells in the area where the seed release takes place. A miniature video camera records the action in the seed meter at high speed for a period of time. An on board processor coverts the high speed video to slow speed play back for the operator to view in the tractor cab on his display screen. The processor can also present additional data such as percent skips, percent doubles, and actual versus theoretical seed rate. Visual slow motion image playback on the operators screen is used to set vacuum, set the doubles eliminator, change seed disk to better match seed shape and size, determine if seeds stick in cells and if more talc needed, determine if a seed cell is plugged, or detect if the seed disk chattering or otherwise acting erratically. A single row can be monitored by the video structure and the data and information used to set all other rows/meters on the planter. Alternately, a camera with optics can be provided on each row. The operator can elect to see a still picture or a series of still pictures displayed on a monitor.

In one embodiment of the invention, the video recording system is designed to be easily moved from one meter to the next. The system may be snapped or plugged into position at a viewing window located adjacent the seed release location on a metering disk. Each meter on the planter can be checked without need for a camera for each planter row unit. In effect, the system provides a built in test stand for optimal meter settings and seed disk selection without need for the grower to take seed samples to a dealer test stand.

These and other objects, features and advantages of the present invention will become apparent from the description below in view of the drawings.

DESCRIPTION OF THE PREFERRED EMBODIMENT

Figure 1:
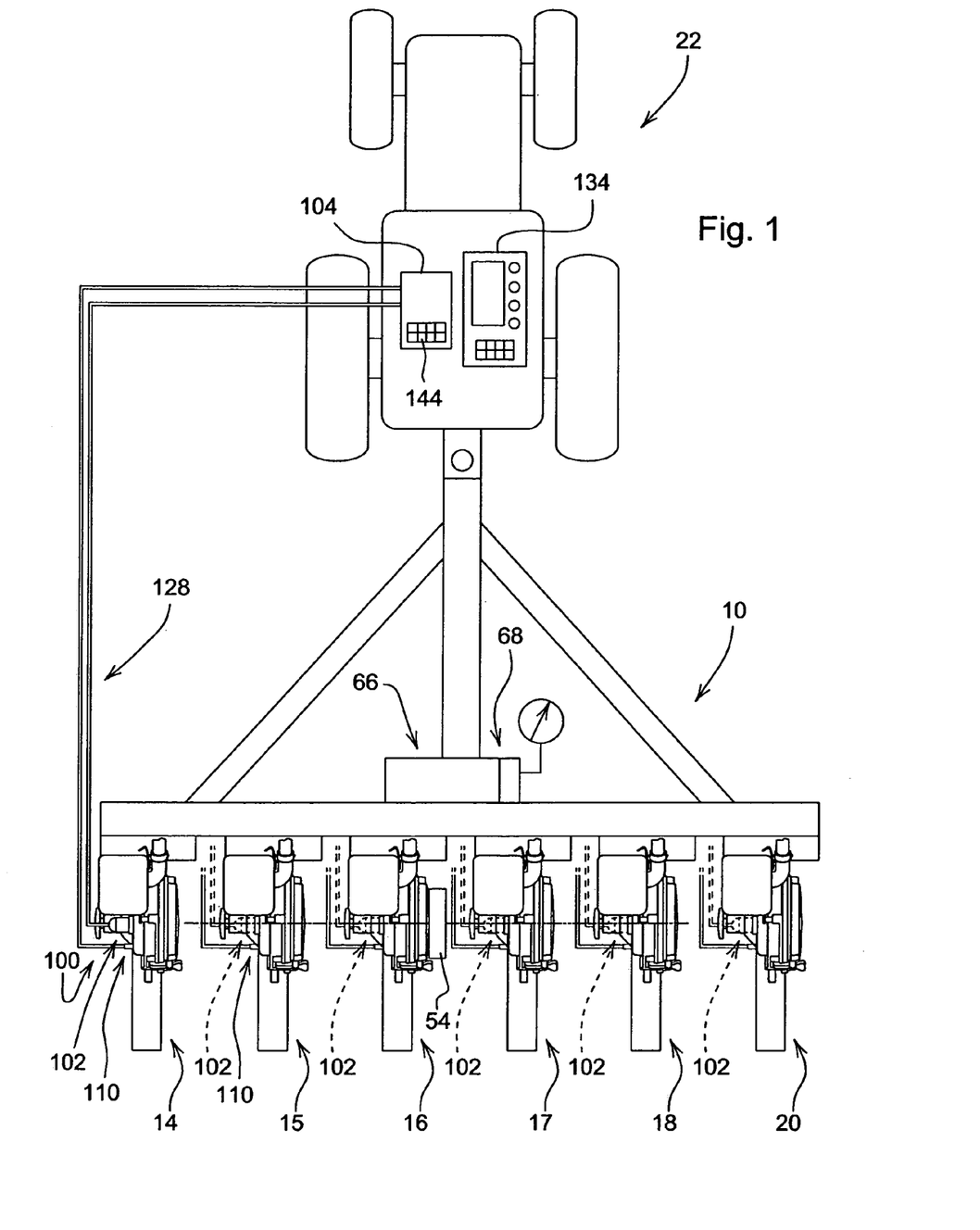
FIG. 1 is schematic representation of tractor and planter with a seed monitoring system attached.

Referring to FIG. 1, therein is shown a planter 10 or similar implement having a main frame or toolbar 12 supporting a plurality of planting units 14, 15, 16, 17, 18 and 20 for towing forwardly over the ground by a tractor 22 or other towing vehicle. The planting units 14-20 are shown as conventional planter row units having row unit frames 24 (FIG. 2) supporting furrow openers, depth gauging wheels and furrow closing structure (not shown).

Figure 2:
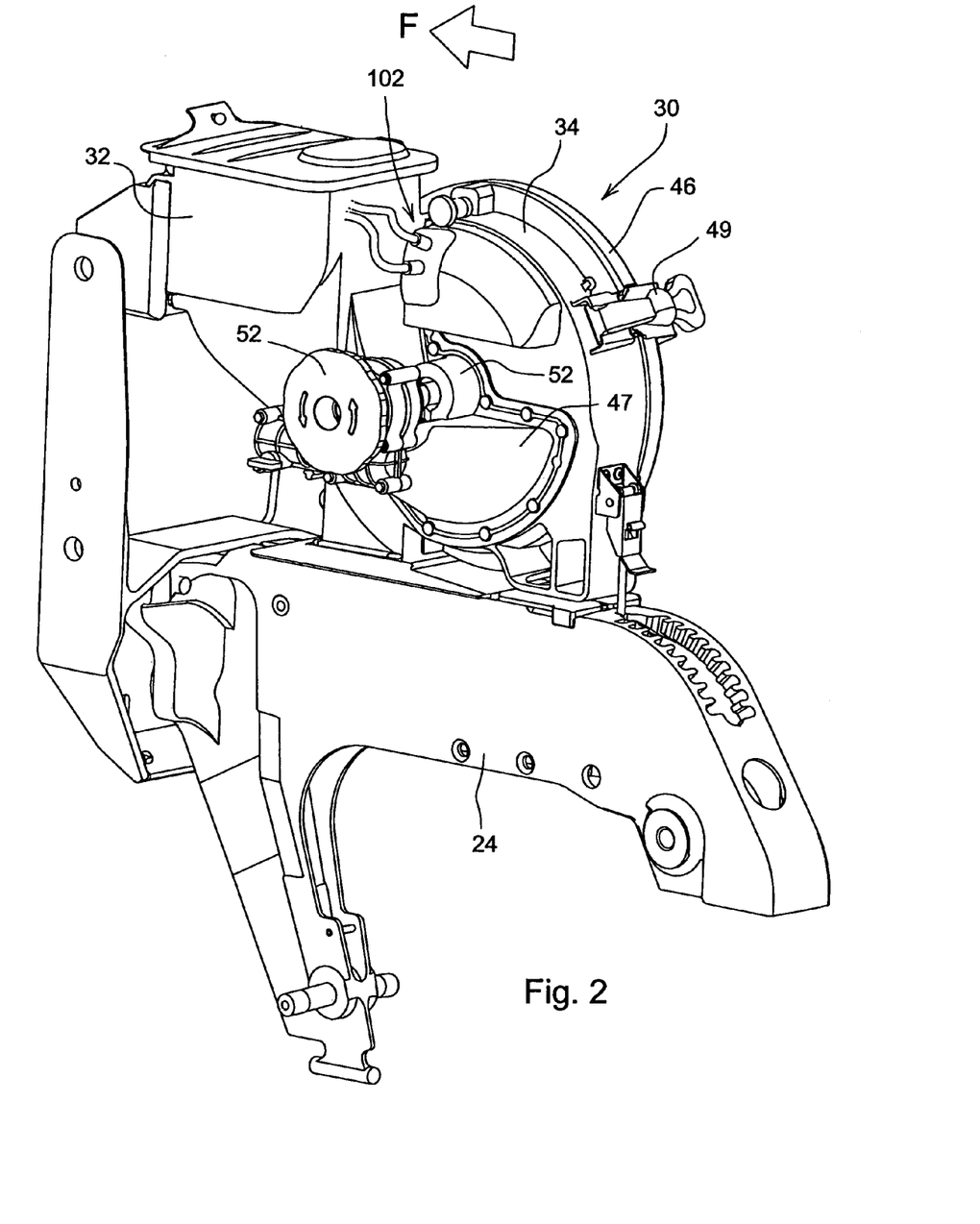
FIG. 2 is view of a portion of a planter row unit showing a portion of a seed meter assembly for the planter of FIG. 1.

Referring to FIGS. 2-5, the adjustable metering system for each of the units 14-20 includes a seed meter 30 in communication with a seed hopper 32. The meter 30 has a housing 34 rotatably supporting a seed disk 40. The housing 34 as shown includes a vacuum side 46 and a seed receiving side 47 which are hinged together at 48 (FIG. 3) and secured in a closed position by a conventional latching arrangement 49 (FIG. 2). The rotatable seed disk 40 includes a hub portion 52 coupled to a variable drive 54.

The seed disk 40, which is shown as a conventional flat disk, includes a series of apertures 56 uniformly spaced radially inwardly of the disk edge and passing from the seed receiving side 47 of the disk 40 through to the vacuum side 46 of the disk. As the periphery of the disk 40 passes through a supply or puddle of seed in the seed receiving side 47 of the housing 34, the vacuum communicated through the apertures 56 draws and holds seed against the apertures in seed cell areas 58 defined by the apertures. The disk 40 stirs and accelerates the seed adjacent the disk to facilitate capture of the seed by the apertures 56.

The seed receiving side 47 communicates with a supply of seed in the hopper 32. An outlet 60 connects the interior of the seed meter 30 to a seed tube 62 or other delivery arrangement for directing the seed to the ground. The vacuum side 46 of the seed meter 30 is coupled to an adjustable air or vacuum source 66 with a pressure adjustment 68 and is provided with a seal 70 which defines a seed release zone 74 where the vacuum is isolated from the apertures 56 to release the seeds held on the apertures of the disk 40. A seed singulator assembly 80 is adjustably supported adjacent the seed cells 56 just upstream of the seed release zone 74 to help eliminate incidences of multiple seeds in a seed cell area 58.

Numerous adjustments are available to vary seeding rate, seed spacing, and seed singulating characteristics. The seed singulator assembly 80 includes a cam and slot 82 connected to a serrated singulator 84. By rotating the cam, the singulator can be moved radially inwardly or outwardy relative to the seed cell areas 58 to optimize seed singulating to limit incidences of more than one seed in a cell area 58. The source pressure adjustment 68 allows the operator to increase or decrease the pressure communicated through the apertures 56 to increase or decrease the force holding the seeds in the cell areas 58. The adjustable drive 54 can be changed to increase or decrease meter disk rotation speed for a given forward planter speed to vary seeding rate. It is to be understood that the above-described adjustment features can take numerous different forms and that other adjustments may also be available to affect singulating, spacing, seeding rate, and the like.

Figure 3:
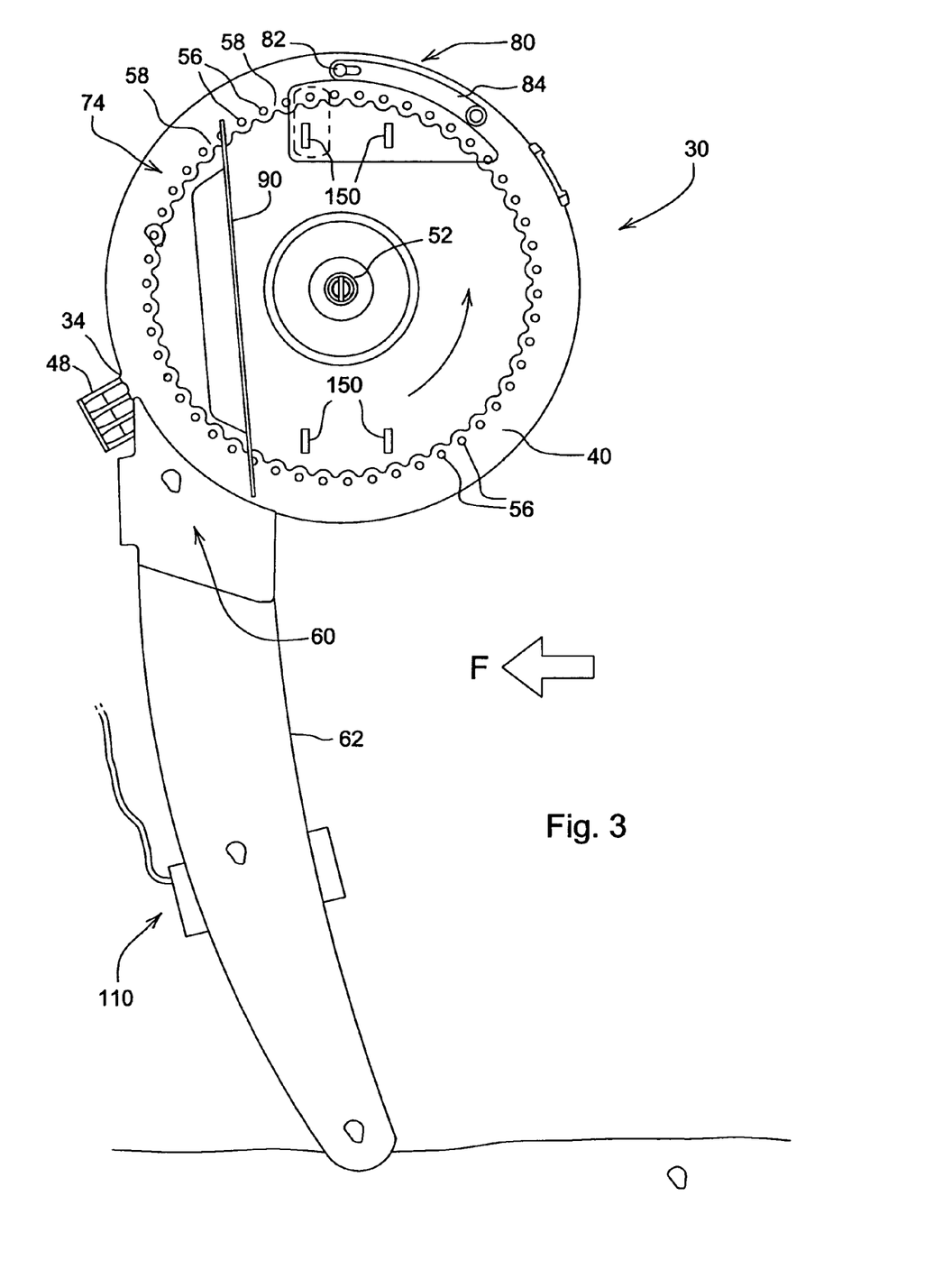
FIG. 3 is a side view of a portion of the seed meter with parts removed to better show component locations.
Figure 4:
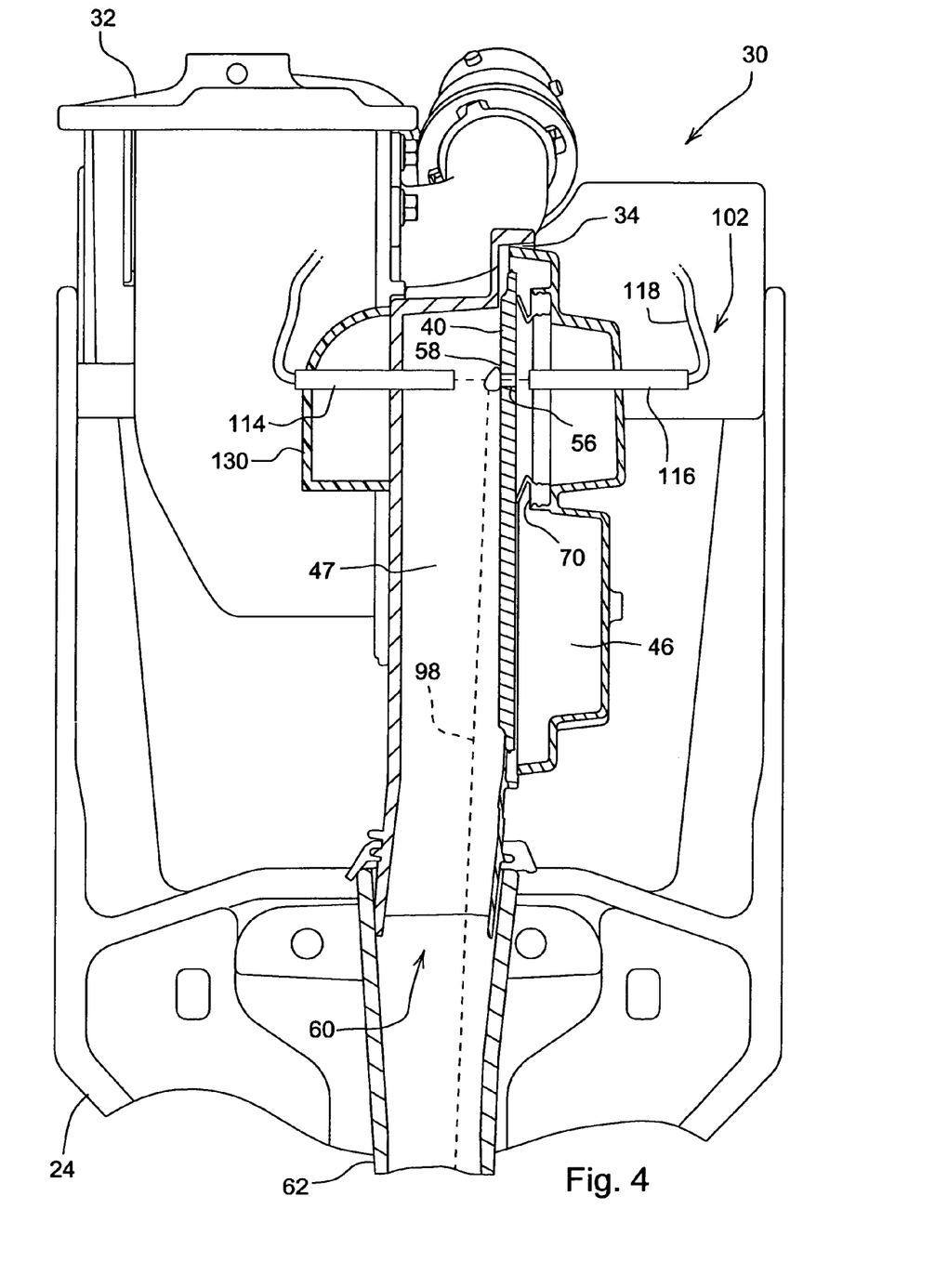
FIG. 4 is a view partially in section of the seed meter showing a detector for providing a signal indicative of presence or absence of material in seed cells of the meter assembly.
Figure 5:
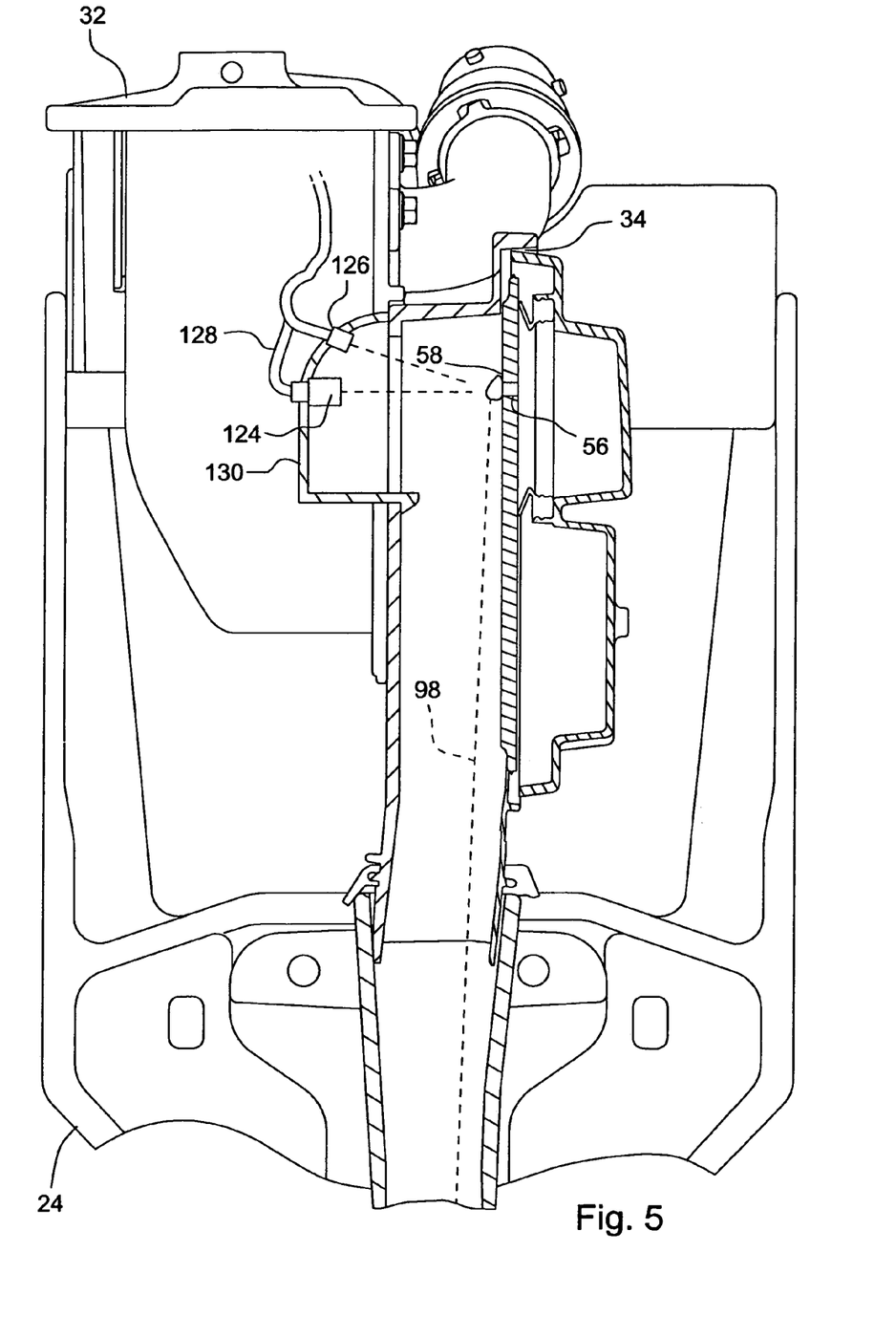
FIG. 5 is a view similar to FIG. 4 but showing an alternate embodiment of the detector.

Seed deposited in the hopper 32 flows downwardly from the hopper 12 through an inlet into the seed receiving side 47 of the housing 34. The seed forms a puddle at the bottom of the housing defined by the seed disk 40 and the seed receiving side 47. Brush retainers 90 form a barrier in the housing 34 that prevents seeds in the seed puddle from directly entering the outlet 60. A vacuum is applied to a seed trapping zone on the vacuum side 46 which draws air from the seed receiving side 47 through apertures 56. This flow of air attracts seeds to the apertures and holds the seeds on the apertures at the seed cell areas 58. Further rotation takes the seed past the singulator assembly 80 and out of the area defined by the seed trapping zone to the seed release zone 74 defined by seal 70. No vacuum exists in the seed release zone so the seed is released from the seed disk and falls into outlet 60 towards the seed deposit area in the soil along a trajectory 98. As shown in FIGS. 3-5, the seed is directed through the seed tube 62 to the planting furrow. Other metering and delivery arrangements may also be used with the present invention, including more direct delivery to the furrow for meters that are closely coupled with the ground.

A seed meter monitor system shown generally at 100 in FIG. 1 includes a detector assembly 102 located at one or more of the meters 30 on the units 14-20 and communicating with a processor 104 located at the operator station of the tractor or on the implement 10 or at a remote location. The detector assembly 102 as shown is supported adjacent the seed cell areas 58 downstream of the singulator assembly 80. The assembly 102 provides seed presence signals indicative of the presence or absence of seeds or other material in the cell areas 58.

The processor 104 receives the seed presence signals and provides an indication of presence or absence of seeds in the seed cells to facilitate adjustments to the adjustable seed meter system to maintain a preselected seed count per seed cell, usually a single seed per cell location, and a given seed rate. A released seed detector, shown in FIG. 3 as a conventional seed detector 110 located in the seed tube 62, provides a seed count signal to the processor 104 indicative of the number of seeds released from the seed disk into the outlet 60 for deposit in the soil. The processor 104 is responsive to the seed count signal and provides a seed population indication to the operator, such as seeds per acre planted. The processor 104 is also responsive to the seed presence signals from the detector assembly 102 and the seed count signals to provide an indication to the operator of missing seeds in the seed cells and multiple seeds in the seed cells.

As shown in FIG. 4, the detector assembly 102 includes a source of light 114 supported in the housing 34 on one side of the disk 40 and directing light towards the cell area 58 and the aperture 56. A light detector 116 is supported on the opposite side of the disk 40 so that light from the source 114 passing through the aperture 56 illuminates the detector when an empty cell area with an empty aperture passes between the source 114 and the detector 116.

The detector 116 is connected by a link 118 to the processor 104 and, when illuminated, sends a signal to the processor 104 indicating that the cell area 58 and aperture 56 are devoid of seed or other material. An empty cell area/aperture signal indicates that a seed cell has failed to pick up or retain a seed and that the seed spacing and seed population will be correspondingly affected. The processor 104 tracks the number of empty cell indications and provides a warning signal to the operator if the number of such indications exceeds a preselected maximum number for a given period of time or area planted.

Figure 6:
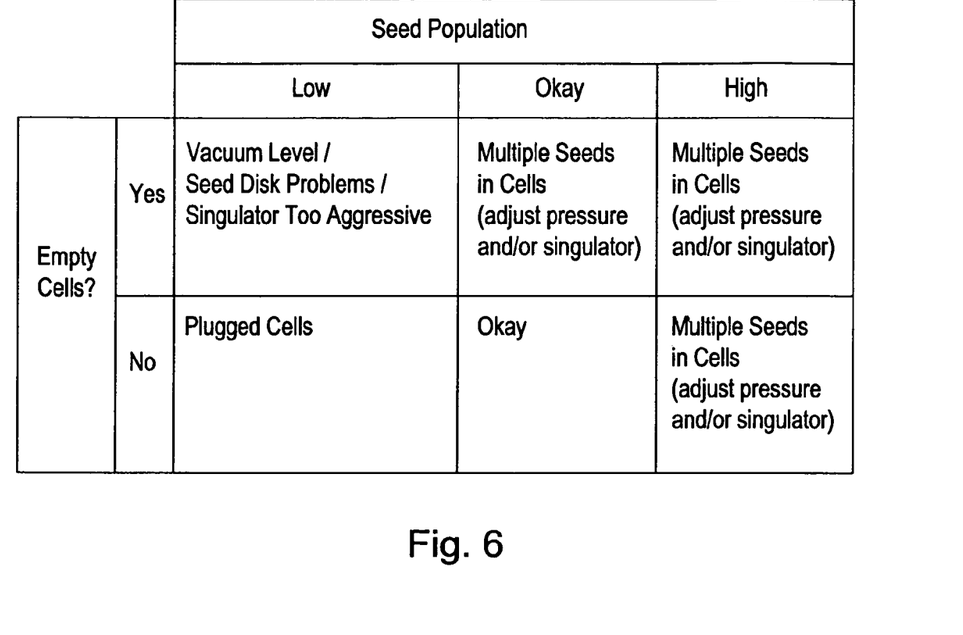
FIG. 6 is decision matrix for use in using information from the detector for determining seed meter adjustments to optimize meter operation.

The processor 104 also calculates a seed population per area or distance traversed by the planter 10 and compares the seed population with the tracked empty cell indications. If the seed population as determined from the seed detectors 110 is low (see the chart of FIG. 6) and empty cells are indicated from the cell area/aperture signals, the processor 104 provides a signal to the operator that the meter system needs to be adjusted to assure better seed pickup. Adjustments to improve pickup include increasing the vacuum level by changing the pressure setting at 68, replacing worn or wobbly seed disks, or adjusting an overly aggressive singulator assembly 80. If, on the other hand, the seed population indication is low and there is a lack of more than a minimal number of empty cells, the processor issues a warning that the cell areas 58 and/or apertures 56 may be plugged with seed or foreign material or the planter drive speed needs to be increased by adjusting the variable drive 54. If the seed population indication is high and the planter drive speed setting is correct, an indication that there are multiple seeds in the seed cell areas 58 is provided to the operator. The pressure setting and/or singulator setting is then adjusted to reduce or eliminate the multiple seed problem.

The system can also diagnose a situation wherein the overall seed population is within the prescribed range but there are problems of multiple seeds in some seed cell areas 58 in combination with empty seed cells in other cell areas 58. If the overall seed population is within the prescribed range but there are empty cells, seed spacing and yield will be adversely affected. Once the processor 104, determines that such a condition with empty and overfilled cells exists, an appropriate warning is provided to the operator.

As shown in FIG. 4, an alternate embodiment of the detector includes a miniature video camera 124 supported by the meter 34 and focused on the seed cell area 58. A source of light 126 illuminates the area 58. The video signal picked up by the camera 124 is communicated via data link 128 to the processor 104. The camera 124 and light source 126 are mounted in a removable window mounting 130 that snaps or is otherwise releasably secured in the viewing area of the meter adjacent the seed release point downstream of the singulator assembly 80. The mounting 130 can be easily repositioned from meter to meter, or an individual camera can be dedicated to a meter. The data link 128 to the processor 104 may take one of several conventional forms, including a data line or bus, an optic cable or a wireless connection.

The processor 104 receives the video signals via link 128 and provides a video output for the operator at a screen 132 on a monitor 134 so the meter operation can be analyzed. The monitor 134 can be an existing implement monitor already available on the tractor 22, an additional monitor, or a monitor at a location such as an office remote from the tractor. In one embodiment, the processor 104 stores short periods of high speed video of the seed release area downstream of the singulator assembly and then displays this information in on the monitor 134 in slow motion so the operator can view cell area seed retention and release characteristics and check for multiple seed, skips and blockages. By viewing video from the actual seed release location, the operator can accurately determine which seed meter system adjustments, if any, need to be changed as well as the type of adjustments that need to be made. For example, problems such as seed disk wobble, plugged cells, excessive pressure resulting in multiple seeds in the cell areas, and improper singulator adjustment can quickly be determined from the video. The output of the camera 124 is typically a series of still pictures, and one or more still shots can easily be stored in the processor and reviewed at a convenient time by the operator. The shots can be viewed as a single photo or can be played back in a video display mode at varying speeds.

If a single camera 124 is provided, the operator can check operation on multiple meters 30 by simply snapping the camera mounting in and out of the various meter window locations. If a plurality of cameras 124 is provided, the operator can select which camera to view using a touch panel input 144 or similar input device on the processor 104 or select an automatic sequencing of the camera signals.

The processor 104 can also include digital video processing for analyzing pixel areas of the video frames to determine problems in the adjustable meter system and provide the appropriate warning to the operator when an improper adjustment becomes evident. Problems of multiple seeds in a cell area or missing seeds in a seed area are determined by analyzing the video frame taken as a cell location passes the camera. If a seed is missing from the cell area 58, the light pattern tends to be more uniform in the area. Multiple seeds in an area 58 provide more contrasting light and dark areas than if a single seed or no seed is present. If there is a blockage, a uniform periodic recurring light pattern will be evident as the seed cell passes the camera. By analyzing the different patterns, the processor 104 can quickly determine seed retention and release problems, wobbly disk problems, blocked cell areas, and other problems that result in predictable pixel variations.

Light reflecting marks, bar codes or other indexing 150 (FIG. 3) on the disk facilitate synchronization of the detector and processor 104 with rotation of the seed disk 40. Signals generated at the detector assembly 102 as the indexing 150 passes are transmitted to the processor 104 for determining disk speed and speed variations and for detector and/or light source synchronization. The input 124 allows the operator to select a mode wherein the camera 124 and the processor 104 provide one or more still shots for viewing by the operator on the monitor 134. The operator can select a particular seed cell area 58 to view or select a sequential viewing of a plurality of cells or a plurality of different meters.

Seed release problems can also be analyzed by looking at the seed and seed location as the seed is released and moves downwardly towards the soil. Camera location can be changed, or one or more cameras added to view and analyze seed and meter action in different areas of the meter 30.

The video camera 124 and processor 104 also can function as described above for the detector assembly 102. For example, a light source similar to that shown at 114 in FIG. 4 can be added at the side of the disk 40 opposite the camera 124 to provide an increased light signal on the video frame when an empty seed cell area 58 passes the camera. The operation of the processor 104 to analyze meter system problems would be generally identical to that described above for FIG. 4.

Having described the preferred embodiment, it will become apparent that various modifications can be made without departing from the scope of the invention as defined in the accompanying claims.

The invention claimed is:

1. In an adjustable seed meter system having moving seed cells for picking up seeds and distributing the seeds towards the ground at a seed population per area of ground, a seed meter monitor comprising:

a detector supported adjacent the seed cells and providing seed presence signals indicative of the presence or absence of seeds in the cells as the cells move adjacent the detector; and a processor receiving the seed presence signals and providing an indication of presence or absence of seeds in the seed cells to facilitate adjustments to the adjustable seed meter system to maintain a seed count per seed cell at the given seed population.

2. The seed monitor as set forth in claim 1 including a population monitor providing a seed count indication of the number of seeds distributed from the seed cells, and wherein the processor is responsive to the seed count indication and the seed presence signals to provide an indication of missing seeds in the seed cells and multiple seeds in the seed cells.

3. The seed monitor as set forth in claim 1 wherein the detector comprises a camera and the processor provides a still picture or slow motion video of the seed cells and seeds picked up by the seed cells to an operator.

4. The seed monitor as set forth in claim 3 wherein the camera is selectively positionable at one of a plurality of seed meters for monitoring seed meter system operation at the seed meters.

5. The seed monitor as set forth in claim 3 including an implement monitor providing an operator readout, wherein the processor provides video information to the implement monitor for review by the operator.

6. The seed monitor as set forth in claim 1 including an adjustable seed singulator for removing all but a single seed from each of the seed cells, wherein the detector is located adjacent the singulator for monitoring singulator operation.

7. The seed monitor as set forth in claim 1 wherein the detector comprises a light detector detecting the presence and absence of light passing through an aperture in the seed cell to provide an indication of an occupied or empty seed cell.

8. The seed monitor as set forth in claim 1 including a light source illuminating the seed cell adjacent the detector.

9. The seed monitor as set forth in claim 8 wherein the light source includes a light pipe terminating adjacent the seed cell.

10. The seed monitor as set forth in claim 1 including a viewing window adjacent the seed cells for visual monitoring of seed cell operation, wherein the detector is mounted to the viewing window.

11. The seed monitor as set forth in claim 10 wherein the viewing window is selectively attachable to and removable from the seed meter system.

12. The seed monitor as set forth in claim 1 wherein the moving seed cells comprise cell locations on a disk rotatable within a seed meter housing, and indexing located on the disk for synchronization of the detector and the processor.

13. In an adjustable seed meter system having moving seed cells within a seed meter housing for picking up seeds and distributing the seeds towards the ground at predetermined spacings and at a given seed population per area of ground, a seed meter monitor comprising:
a source of light located within the housing for illuminating the seed cells;
a detector supported within the housing adjacent the seed cells and providing seed presence signals indicative of the presence or absence of seeds in the cells as the cells move adjacent the detector;
a seed counter for providing a seed count indication;
a processor responsive to the seed presence signals and the seed count indication for detecting multiple seeds the seed cells and missing seeds in the seed cells; and
an adjustable seed retention control device adjustable in response to the seed presence signal and seed count indication for control of the number of seeds in the moving seed cells.

14. The seed monitor as set forth in claim 13 wherein the detector comprises a video camera and the processor provides slow motion video of the seed cells and seeds picked up by the seed cells to an operator.

15. The seed monitor as set forth in claim 13 wherein the detector comprises a light detector, and wherein the source of light is located on a first side of the seed cells and the light detector is located on a side of the seed cells opposite the first side for detecting the absence of seed in the seed cells.

16. The seed monitor as set forth in claim 13 wherein the adjustable seed retention control device includes a seed singulator for removing all but a single seed from each of the seed cells, wherein the source of light and the detector are located adjacent the singulator.

17. The seed monitor as set forth in claim 13 including indexing offset from and movable with the seed cells, the indexing providing a cell location signal to the processor.

18. In an adjustable seed meter system having moving seed cells within a seed meter housing for picking up seeds and distributing the seeds to the ground at a seed population per area of ground, a seed meter monitor comprising:
means for detecting the presence or absence of material in the cells;
means for providing a seed population per area of ground; and
means responsive to the presence or absence of material in the cells and the seed population per area of ground indication for providing an indication of:
two or more seeds in the seed cells;
empty seed cells; or
plugged seed cells.

19. The seed meter monitor as set forth in claim 18 wherein the means for detecting the presence or absence of material in the seed cells comprises a source of light located within the seed meter housing.

20. The seed meter monitor as set forth in claim 18 wherein the means for detecting the presence or absence of material in the cells comprises a camera.

21. The seed monitor as set forth in claim 20 further including a processor connected to the camera and providing still shots or slow motion video of the seed cells and seeds picked up by the seed cells to an operator.

22. A method for determining adjustments for an adjustable seed meter system having moving seed cells within a seed meter housing for picking up seeds and releasing the seeds, and an outlet for distributing the released seeds towards the ground, the method comprising the steps of:
providing a signal processor;
supporting a detector adjacent the seed cells for detecting the picked up seeds prior to distribution through the outlet and providing seed cell signals to the processor indicative of the presence or absence of material in the cells;
providing population signals to the processor indicative of the number of seeds distributed towards the ground;
processing the seed cell signals and population signals in the processor and providing an indication to the operator indicative of one or more of the following conditions:
two or more seeds in the seed cells;
erratic seed movement towards the outlet
empty seed cells; or
plugged seed cells.

23. The method as set forth in claim 22 wherein the step of analyzing includes:
comparing the seed cell signals and the population signals.

24. The method as set forth in claim 22 wherein the step of supporting the detector includes mounting the detector from the seed meter housing adjacent the seed cells upstream of the outlet.

25. The method as set forth in claim 22 including the step of illuminating the moving seed sells with a light source located within the housing.

26. The method as set forth in claim 22 wherein the step of supporting a detector includes supporting a camera from the seed meter housing, and the step of analyzing includes analyzing the characteristics of video or still pictures from the camera.

27. The method as set forth in claim 22 including the steps of providing indexing adjacent the seed cells to provide indexing signals to the processor.

* * * * *